Patented Oct. 29, 1946

2,410,356

UNITED STATES PATENT OFFICE 2,410,356

PURIFICATION OF TETRAETHYL LEAD

Alfred Edwin Parmelee, Wilmington, Del., assignor to E. I. du Pont de Nemours & Company, Wilmington, Del., a corporation of Delaware No Drawing. Application May 29, 1943,
Serial No. 489,067

7 Claims. (Cl. 260—437)

This invention relates to the purification of tetraethyl lead and more particularly to the process of removing sludge-forming impurities from the tetraethyl lead.

In the commercial process of manufacturing tetraethyl lead and other tetraalkyl lead compounds, lead is reacted with sodium to form a lead monosodium alloy. This alloy is then reacted with ethyl chloride or with a mixture of ethyl chloride and methyl chloride. After the reaction is complete the tetraethyl lead and other tetraalkyl lead compounds are removed from the reaction mass by steam distillation. Small quantities of finely divided metallic lead and inorganic solids are carried over with the tetra alkyl lead in the steam distillation. Such solid suspended materials may be removed by the method disclosed in my prior Patent No. 1,975,171.

The lead, employed in such process, usually contains small amounts of bismuth and other metallic impurities. Such impurities, especially the bismuth, also react with the ethyl chloride to form organo-metallic compounds which are carried over with the tetraalkyl lead in the steam distillation. These other organo-metallic compounds are less stable than the tetraethyl lead and tend to decompose and form sludge which settles in the bottom of tank cars, drums, tanks and the like. This sludge will contain up to about 70% bismuth compounds, up to about 20% lead compounds and small amounts of compounds of other metals. The amount of sludge, obtainable from all of the sludge-forming impurities present in any sample of tetraalkyl lead, is termed the potential sludge content of such sample.

This sludge is objectionable. Frequently, the sludge is highly inflammable and very reactive on exposure to air. It contains substantial amounts of adsorbed tetraalkyl lead which is always poisonous and hazardous to handle. The sludge, when deposited in tank cars, drums, tanks, etc., must be periodically removed. The removal and disposal of such sludge is a hazardous task and requires the use of specially designed equipment and specially trained workers.

The formation of sludge and its removal from tank cars, etc., has long been a problem. It has been proposed to incorporate, in tetraethyl lead, compounds for inhibiting the formation of sludge. These sludge inhibitors have not proved to be entirely satisfactory and have not solved the problem. Previously proposed methods of purifying the crude tetraethyl lead have also failed to solve this problem.

In a co-pending application Serial No. 393,680, filed May 15, 1941, jointly by William de Benneville Bertolette and myself, now Patent No. 2,400,383, granted May 14, 1946, it is disclosed that these problems may be very satisfactorily solved by aerating the tetraalkyl lead, whereby the sluge-forming impurities are caused to form sludge in a small space of time. Such sludge is removed from tetraethyl lead whereupon the tetraethyl lead is purified by the substantially complete removal of the sludge-forming impurities. While such process is highly successful, it is sometimes desirable to employ other means to remove the sludge-forming materials because of the volatility of the tetraalkyl lead compounds.

It is an object of my invention to overcome the problem of sludge formation in tetraethyl lead and mixtures containing it. Another object is to provide a method for producing stable tetraethyl lead compositions. A further object is to provide an improved method of purifying tetraethyl lead. A still further object is to provide a simple and improved method for removing sludge-forming compounds from crude tetraethyl lead. Other objects are to provide more stable tetraethyl lead compositions and to advance the art. Still other objects will appear hereinafter.

The above and other objects may be accomplished in accordance with my invention by washing crude tetraethyl lead, containing sludge-forming impurities, with a weak aqueous solution of certain oxidizing agents which will react with the sludge-forming impurities without causing substantial decomposition of the tetraethyl lead. I have found that some oxidizing agents, when employed in suitable concentration, will react with the sludge-forming impurities to convert them to insoluble materials or to water-soluble materials or both, without causing substantial decomposition of the tetraethyl lead. I have found further that, by washing crude tetraethyl lead with such weak aqueous solutions of such oxidizing agents, it is possible to remove the sludge-forming impurities substantially completely from crude tetraethyl lead. The tetraethyl lead, so treated, is substantially purer and is very much more stable in storage.

The oxidizing agents, which I have found to be effective for my purpose, are hydrogen peroxide and the dichromates, peroxides, perborates, and chlorites of the alkali metals and the alkaline earth metals. The sludge-forming impurities, particularly the bismuth compounds, have been successfully removed from the crude commercial tetraethyl lead by washing the tetraethyl lead with an equal volume of a 1% aqueous solution of each of hydrogen peroxide, sodium dichromate, potassium dichromate, calcium peroxide, sodium peroxide, sodium perborate, and sodium chlorite. Of these oxidizing agents, I have found hydrogen peroxide and the alkali metal dichromates to be the most effective and desirable.

Generally, the washing of the tetraethyl lead, in accordance with my invention, is carried out in the presence of air without any attempt being made to exclude air from the washing equipment, or the washing solution. Some oxidizing agents are substantially ineffective when oxygen, as in the air, is excluded from the equipment and from the washing solution. Even when air or other oxygen-containing gas was excluded, by replacing the air with nitrogen, satisfactory removal of the sludge-forming materials, particularly bismuth compounds, was obtained by treatment with solutions of some of the oxidizing agents, such as hydrogen peroxide, calcium peroxide, sodium peroxide, sodium perborate (1% solution, sodium chlorite + 1% $H_2SO_4$, and the alkali metal dichromates + 1% $H_2SO_4$. By "+ 1% $H_2SO_4$," I mean that the wash solution contained 1% sulfuric acid.

While all of the oxidizing agents within my invention appear to operate successfully when they are employed in 1% concentration in water, my invention is not to be limited to the use of 1% concentration. Each of the oxidizing agents may be employed in higher or lower concentration, the exact limits of which will vary with the individual oxidizing agent. Sodium dichromate and potassium dichromate have been found effective in concentrations of from 1% to 25% and do not appear to attack the tetraethyl lead in any of such concentrations. When the alkali metal dichromates are employed in concentrations as low as 0.5%, the quantity of sludge-forming impurities removed from the tetraethyl lead falls off rapidly. If it is desired to employ the alkali dichromates with the exclusion of air or oxygen, it is necessary to employ them in slightly acid solution, such as that provided by 1% of sulfuric acid, in order to remove the sludge-forming impurities.

When the oxidizing agent is hydrogen peroxide, it will generally be employed in concentrations within the range of 0.35% to 5% and preferably in concentrations of from about 0.7% to about 1.3%. I have used hydrogen peroxide in a concentration as low as 0.08% effectively. Lower concentrations of hydrogen peroxide generally give incomplete removal of the sludge-forming impurities. Concentrations of hydrogen peroxide between 0.08% and 0.35% will generally not give consistent results. Concentrations of hydrogen peroxide as high as 8% to 10% will not be as satisfactory as, at such concentrations, the hydrogen peroxide attacks the tetraethyl lead itself causing undesirable decomposition of the tetraethyl lead.

The amount of the aqueous solution to be employed for washing the tetraethyl lead may be widely varied, it being essential only to employ sufficiently large amounts to provide sufficient oxidizing agent to react with the sludge-forming impurities, particularly the sludge-forming bismuth compounds, present in the tetraethyl lead. Generally, about one volume of the solution of the oxidizing agent will be sufficient for washing 5 volumes of tetraethyl lead and removing the sludge-forming impurities therefrom. In other words, at least ⅕ volume of the washing solution should be used for each volume of the tetraethyl lead. When the oxidizing agent is an alkali metal dichromate, such as sodium dichromate and potassium dichromate, it is generally necessary to employ one-half volume of the solution for each volume of the tetraethyl lead. In practice, I have found that the best results are obtained by employing approximately one volume of the aqueous solution of the oxidizing agent for each volume of the tetraethyl lead. Much larger volumes of the washing solution can be employed, but without advantage. Attack of the tetraethyl lead and of the sludge-forming impurities by the oxidizing agent depends upon the particular oxidizing agent employed and its concentration in the aqueous solution, rather than the amount of aqueous solution employed.

In carrying out the washing of the crude tetraethyl lead in accordance with my invention, the tetraethyl lead and the aqueous solution are placed in a suitable container provided with means for agitation. The tetraethyl lead and the aqueous solution are agitated and mixed together for a period of time, depending upon the effectiveness of the agitation and the activity of the oxidizing agent, sufficient for the oxidizing agent to react with the sludge-forming impurities. In laboratory size experiments, where the materials may be intimately mixed by shaking, only a minute or two is required. In large scale operations, where contact between the two materials is less easily accomplished, one to two hours agitation may be necessary. When the reaction of the oxidizing agent with the sludge-forming materials is complete, the agitation is stopped and the mixture allowed to settle whereupon 2 layers are formed, the lower layer being the purified tetraethyl lead and the upper layer being the aqueous solution. When the sludge-forming impurities are converted to insoluble materials, they will collect in the aqueous layer mainly at the interface between the two layers. The purified tetraethyl lead may be drawn off from beneath the water layer. While it is not always necessary to filter the purified tetraethyl lead, it is generally desirable to filter it so as to insure that no precipitated material will be included in the purified tetraethyl lead.

In order to illustrate my invention and a mode of carrying the same into effect, the following example is given:

*Example.*—One thousand parts by weight of tetraethyl lead with a potential sludge content of 1.492 pounds per 100 gallons are placed in a suitable tank provided with an agitator and necessary connections for adding water and other materials and for introducing and removing tetraethyl lead. A solution of 100 parts of water containing 0.7% hydrogen peroxide is added and the contents agitated for 45 minutes. The mixture is allowed to settle for one hour and the tetraethyl lead is drawn off from beneath the aqueous layer. The tetraethyl lead is clear and analysis shows it to have a potential sludge content of only 0.003 pound per 100 gallons, indicating a removal of 99.8% of the sludging impurities. Sludging tests show the material to be stable in storage.

It will be understood that the preceding example and the oxidizing agents specifically named are given for illustrative purposes and that various modifications and variations may be made therein without departing from the spirit or scope of my invention. While I have disclosed the mixing of the tetraethyl lead with the desired volume of the aqueous solution in a single operation, and that is the preferred method of practicing my invention, it will be apparent that the tetraethyl lead can be subjected to successive washings with smaller increments of the washing solution. Also, the washing solution may contain trisodium phosphate or other wetting agent disclosed in my Patent No. 1,975,171 so as to at the same time remove finely divided metallic lead and the like from the tetraethyl lead and combine the process of this invention with the process of such patent. The use of such wetting agent will aid in dispersing sludge-forming impurities, which have been converted to insoluble materials, in the aqueous solution and aid in the removal of such materials from the tetraethyl lead.

When the oxidizing agent employed is an alkali metal dichromate, the washing solution may also contain about one to about 2% of a salt such as sodium chloride and sodium acetate to improve the filtering qualities of the precipitated impurities and to overcome the tendency toward the formation of an emulsion between the tetraethyl lead and the aqueous solution.

Further, the activity of oxidizing agents, such as the chlorites and dichromates, usually will be improved by employing a small proportion of a nonoxidizing mineral acid, such as about 1% of sulfuric acid or hydrochloric acid in the aqueous solution.

The washing of tetraethyl lead with the aqueous solutions of oxidizing agents in accordance with my invention may also be employed in combination with the aeration process disclosed in the co-pending application Serial No. 393,680, filed May 15, 1941, jointly by William de Benneville Bertolette and myself, now Patent No. 2,400,383, granted May 14, 1946. In such case, the oxidizing agents will assist in the oxidation of the sludge-forming impurities by the air even when the oxidizing agents are employed in very low concentrations at which they themselves are ineffective to remove the sludge-forming impurities. Under such conditions, the oxidizing agents appear to act as catalysts in the aeration process.

I claim:

1. The method of purifying steam distilled tetraethyl lead, containing sludge-forming impurities, which comprises washing the tetraethyl lead with at least 1/5 volume of an aqueous solution of hydrogen peroxide containing from about 0.35 to about 5% of hydrogen peroxide.

2. The method of purifying steam distilled tetraethyl lead, containing sludge-forming impurities, which comprises washing the tetraethyl lead with approximately 1 volume of an aqueous solution of hydrogen peroxide containing approximately 1% of hydrogen peroxide.

3. The method of purifying steam distilled tetraethyl lead containing sludge-forming impurities, which comprises agitating the tetraethyl lead with at least 1/5 volume of a weak aqueous solution of an oxidizing agent of the class consisting of hydrogen peroxide, alkali metal peroxides, alkaline earth metal peroxides, alkali metal perborates and alkaline earth metal perborates for sufficient time for the oxidizing agent to react with the sludge-forming impurities, the concentration of the oxidizing agent in the aqueous solution being sufficient to react with the sludge-forming impurities but insufficient to cause substantial decomposition of the tetraethyl lead, settling the mixture and separating the tetraethyl lead from the aqueous solution and the reaction products of the oxidizing agent with the sludge-forming impurities.

4. The method of purifying steam distilled tetraethyl lead containing sludge-forming impurities, which comprises agitating the tetraethyl lead with approximately 1 volume of a weak aqueous solution of an oxidizing agent of the class consisting of hydrogen peroxide, alkali metal peroxides, alkaline earth metal peroxides, alkali metal perborates and alkaline earth metal perborates for sufficient time for the oxidizing agent to react with the sludge-forming impurities, the concentration of the oxidizing agent in the aqueous solution being sufficient to react with the sludge-forming impurities but insufficient to cause substantial decomposition of the tetraethyl lead, settling the mixture and separating the tetraethyl lead from the aqueous solution and the reaction products of the oxidizing agent with the sludge-forming impurities.

5. The method of purifying steam distilled tetraethyl lead containing sludge-forming impurities, which comprises agitating the tetraethyl lead with at least 1/5 volume of a weak aqueous solution of an oxidizing agent of the class consisting of hydrogen peroxide, alkali metal peroxides, alkaline earth metal peroxides, alkali metal perborates and alkaline earth metal perborates for sufficient time for the oxidizing agent to react with the sludge-forming impurities, the concentration of the oxidizing agent in the aqueous solution being approximately 1%, settling the mixture and separating the tetraethyl lead from the aqueous solution and the reaction products of the oxidizing agent with the sludge-forming impurities.

6. The method of purifying steam distilled tetraethyl lead containing sludge-forming impurities, which comprises agitating the tetraethyl lead with at least 1/5 volume of a weak aqueous solution of sodium peroxide for sufficient time for the sodium peroxide to react with the sludge-forming impurities, the concentration of the sodium peroxide in the aqueous solution being approximately 1%, settling the mixture and separating the tetraethyl lead from the aqueous solution and the reaction products of the sodium peroxide with the sludge-forming impurities.

7. The method of purifying steam distilled tetraethyl lead containing sludge-forming impurities, which comprises agitating the tetraethyl lead with at least 1/5 volume of a weak aqueous solution of sodium perborate for sufficient time for the sodium perborate to react with the sludge-forming impurities, the concentration of the sodium perborate in the aqueous solution being approximately 1%, settling the mixture and separating the tetraethyl lead from the aqueous solution and the reaction products of the sodium perborate with the sludge-forming impurities.

ALFRED E. PARMELEE.